United States Patent [19]
Ayral et al.

[11] Patent Number: 5,050,175
[45] Date of Patent: Sep. 17, 1991

[54] PULSED POWER LASER WITH MOPA STRUCTURE WITH NONLINEAR ENERGY TRANSFER MEDIUM

[75] Inventors: Jean-Luc Ayral; Jean-Pierre Huignard, both of Paris, France

[73] Assignee: Thomson-CSF, Puteaux, France

[21] Appl. No.: 533,439

[22] Filed: Jun. 5, 1990

[30] Foreign Application Priority Data

Jun. 13, 1989 [FR] France .................................. 89 07785

[51] Int. Cl.$^5$ ................................................ H01S 3/10
[52] U.S. Cl. ........................................ 372/21; 372/69; 372/106
[58] Field of Search .......................... 372/21, 69, 106; 307/425-427

[56] References Cited

U.S. PATENT DOCUMENTS 4,734,911  3/1988  Bruesselbach ........................ 372/21

OTHER PUBLICATIONS

Christian et al., "Energy Transfer Between Injection-Locked Single Mode Diode Lasers Between Two-Beam Coupling in BaTiO$_3$", Opt. Lett (14); Jan. 1, 1989.

Primary Examiner—Léon Scott, Jr.
Attorney, Agent, or Firm—Oblon, Spivak, McClelland, Maier & Neustadt

[57] ABSTRACT

The aim is to provide a new power laser configuration enabling the delivery of a beam of high spatial quality with an optimum efficiency of extraction of energy. It can be applied, more particularly, to Q-switch solid-state lasers, in doing away with recourse to specific elements for compensation of aberrations. The structure of emission of a power pulsed laser signal, of the type comprising, firstly, an oscillator stage with low-level output beam and, secondly, a power amplifier stage, is characterized in that the power amplifier stage is formed by a laser amplifier that produces a pump beam cooperating with distinct means for energy transfer without phase transfer from said pump beam towards said low-level beam coming from the oscillator.

19 Claims, 2 Drawing Sheets

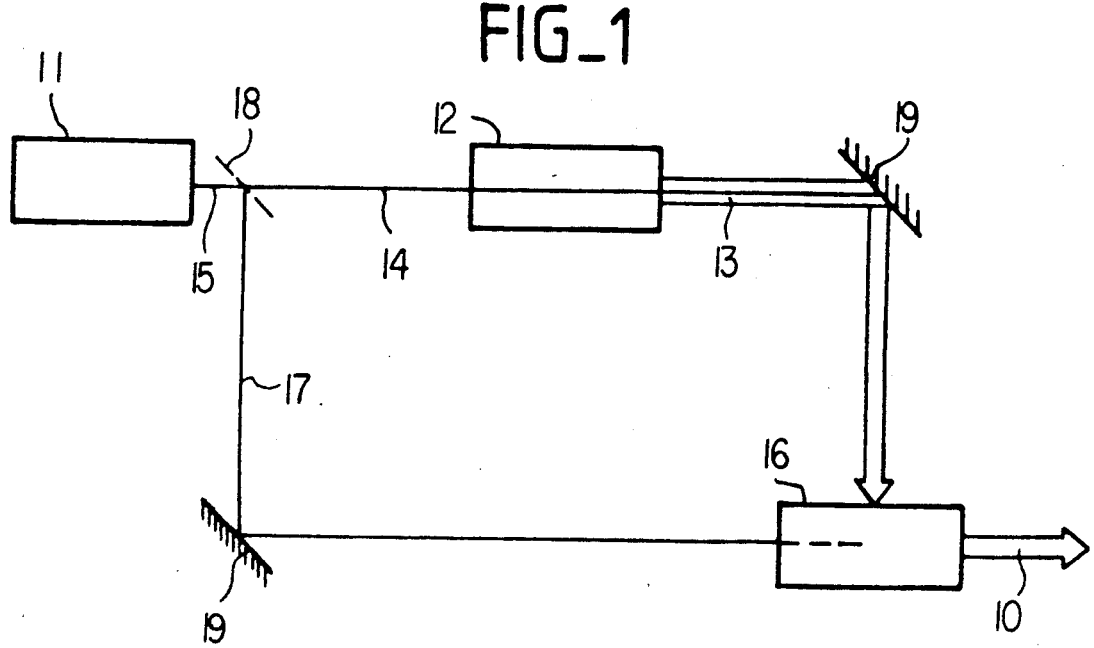
FIG_1
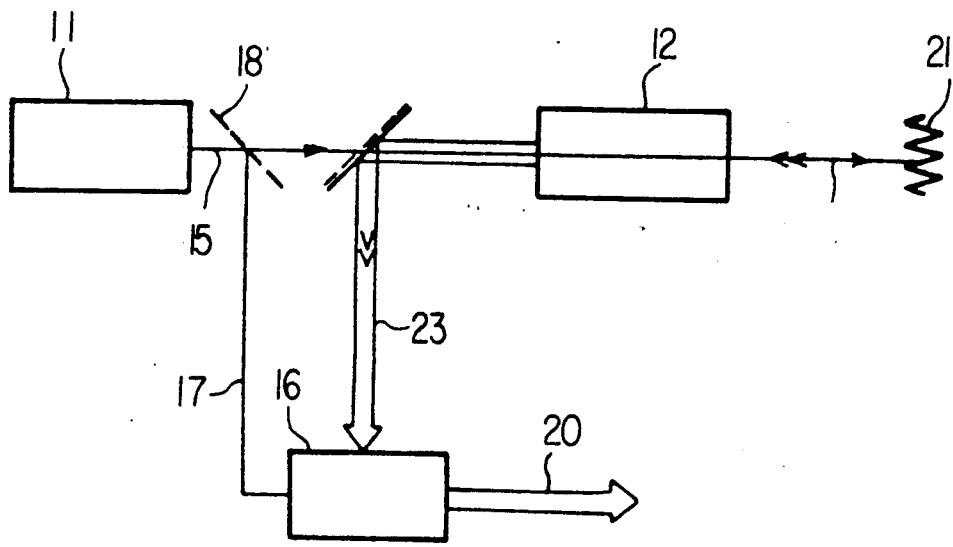
FIG_2

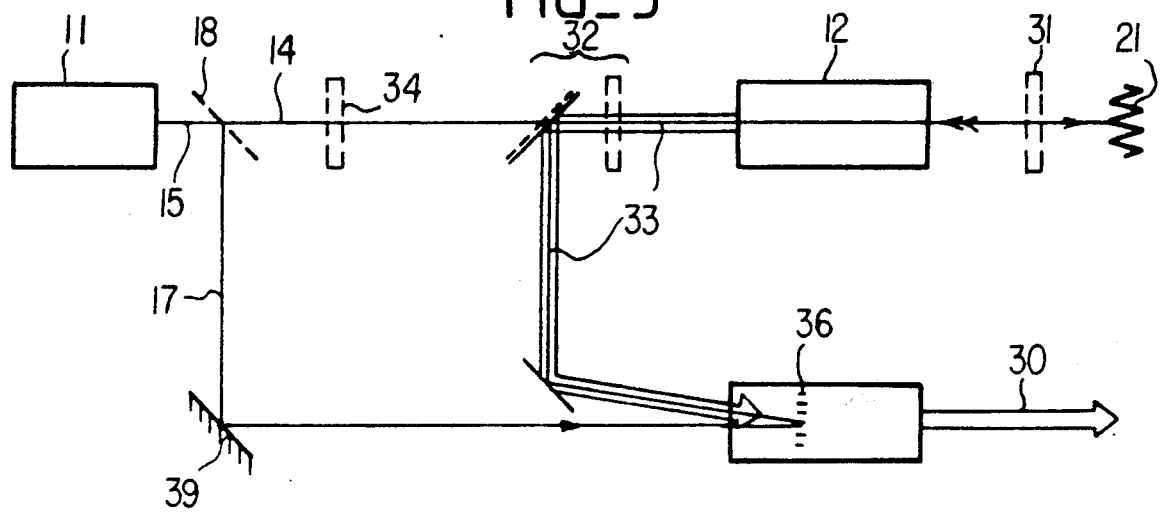
FIG_3
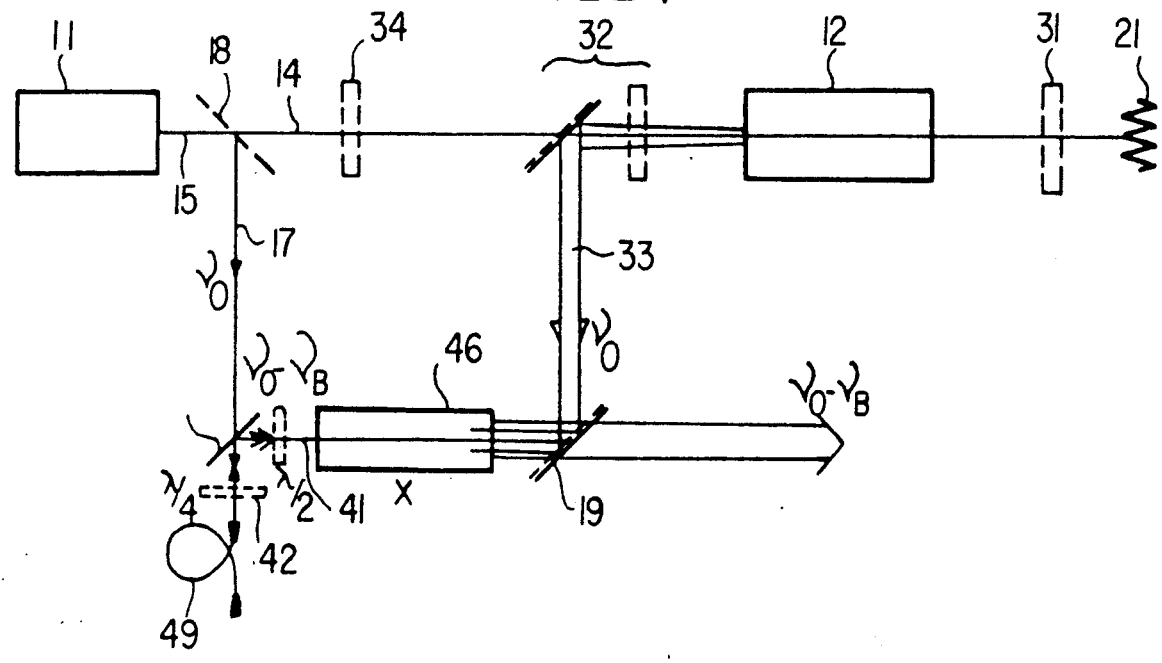
FIG_4

PULSED POWER LASER WITH MOPA STRUCTURE WITH NONLINEAR ENERGY TRANSFER MEDIUM

BACKGROUND OF THE INVENTION

1. Field of the Invention

The present patent application concerns a new power laser configuration enabling the delivery of a beam of high spatial quality with optimum efficiency of energy extraction. It can be applied more particularly to solid-state Q-switch lasers.

The applications of this type of laser are found notably in telemetry and missile guidance by laser. They make it necessary, for example, to have short pulses ($10^{-8}$s) at a repetition rate of some tens of Hz. The large quantity of energy needed per pulse, from 100 to 300 mJ for example, makes it necessary to develop high peak values, of the order of 10 MW in the example chosen.

Known solid-state Q-switch lasers (YAG, Ruby, GSGG) are used in systems integrating the telemetry or target-illumination functions. Present-day lasers are essentially compact oscillators, flash-lamp-pumped, with triggering by resonant cavity (Q switch). The Q switch is, for example, in the form of an electro-optical crystal with two states: during the switching of the crystal, a giant pulse occurs resulting from the accumulation of energy in the resonant cavity between two switchings.

It is important to be able to increase the output energy of these lasers in order to diminish their divergence, which is presently far from the diffraction limit. One of the reasons, of course, is the need to increase the range of these systems.

Now, the performance characteristics of these flash-lamp-pumped oscillators are limited, all the more so as their mean power increases owing to constraints of a thermal origin induced in the laser rod. These thermal constraints are due to the fact that a major part of the energy delivered by the flash lamps is dissipated in heat in the rod. This results, firstly, in the appearance of a heat lens in the cavity, which induces phase distortions that are difficult to correct in the power build-up mode of the laser and, secondly, by the induction of a birefringency which depolarizes the beam and, hence, leads to a reduction in the energy extracted from the cavity by Q switching.

There are at least two other known approaches that are used to try and reduce these thermal effects, or even to get rid of them:

a first approach consists in reducing the part of energy dissipated in heat in the laser rods. This may be achieved by means of a resonant pumping by power laser diode. Thus, in the article by D.S. Sumida, in IEEE J.QE-24, No. 6, June 1988, it is estimated that the energy dissipated as heat in the YAG crystal laser is reduced by a ratio of 7 to 10 in using diodes rather than flash lamps. It must be noted that the thermal load, although smaller, is not zero and could therefore be substantial if the rate is increased for example. The second approach provides a solution to this constraint.

this second approach consists in dynamically cancelling the effects of the various aberrations. Nonlinear optics provide attractive and efficient solutions to achieve these functions.

The invention falls within the framework of the latter approach.

In a first known embodiment implementing this approach, a MOPA (master-oscillator-power-amplifier) structure laser is used. In this structure, the oscillator has an output energy that is low enough for the beam to have excellent quality (from the viewpoint of its divergence) and the amplifier stage provides the energy to the beam.

However, the drawback encountered in this type of structure is that the generation of aberrations, notably of thermal origin, is transferred to the amplifier stage.

There are known ways of reducing these aberrations very sharply, by compensation as described in the patent document PCT 87/05751 on behalf of the HUGHES Aircraft Company. This document describes a MOPA type laser in which the amplifier stage includes a conjugate mirror positioned on the output optical path of the laser amplifier of the MOPA structure, which reflects the laser ray and prompts a second pass by the beam through the laser amplifier. During the second pass, the radiation that goes through the stage is a radiation in conjugate phase, so as to achieve a compensation of the aberrations. The system described further comprises optical delay means preventing the overlapping of the laser pulses of the first and second passes through the laser amplifier.

The present invention concerns a MOPA-type laser structure working according to principle different from that of the HUGHES system.

More precisely, the invention is aimed at providing a power laser configuration of high efficiency and high spatial quality, without transfer of the aberrations introduced by the power amplifier stage. The idea is to amplify the beam of the oscillator of the MOPA without distortion, in avoiding recourse to specific elements for the compensation of aberrations.

SUMMARY OF THE INVENTION

According to the invention, this aim is achieved by means of a structure for the emission of a pulsed power laser signal, of the type comprising, firstly, an oscillator stage with low-level output beam and, secondly, a power amplifier stage, said power amplifier stage being formed by a laser amplifier that produces a pump beam, cooperating with distinct means for the transfer of energy without phase transfer from said pump beam towards said low-level beam coming from the oscillator.

In this way, the perfectly controlled temporal and spatial characteristics of the beam coming from the oscillator are preserved during the amplification without distortion being made in the distinct energy transfer means. For, because the energy transfer is done without transfer of the phase structure of the pump beam towards the signal to be amplified, the output beam from the laser, after this amplification, possesses the temporal and spatial properties of the beam at output of the oscillator.

Advantageously, said energy transfer means are constituted by a nonlinear material formed either by a photo-refractive material (for example $BaTiO_3$ or SBN) or by a medium for applying the stimulated Brillouin scattering process.

Should the nonlinear medium be constituted by a photo-refractive material, said pump beam and said low level beam coming from the oscillator have a low relative angle of incidence of between about 5° and about 30° at entry into said photo-refractive material.

In the case of the stimulated Brillouin scattering, said Brillouin energy transfer medium cooperates with means for making the low level beam coming from the oscillator undergo a frequency shift with respect to the pump beam, by means of an optical element of the same Brillouin medium as said energy transfer means. These shifting means are advantageously formed by a hollow core multimode optical fiber filled with the material of said Brillouin energy transfer medium, the fiber being associated with optical delay means.

Whatever the case may be, said Brillouin energy transfer means preferably cooperate with selective reflecting means providing for the selective admission, into said energy transfer means, of said beam that has come from the oscillator and is frequency shifted and/or said pump beam.

According to another characteristic of the invention, and irrespectively of the nature of the energy transfer means, said laser amplifier is advantageously mounted so as to be supplied with a fraction of the low-level beam coming from the oscillator. Preferably, said laser amplifier cooperates with means for transmitting the beam in at least one second pass through said amplifier stage. Said means for transmitting the beam ar advantageously formed by a pseudo-mirror with phase conjugation, cooperating with an optical delay line, ensuring that there is no overlapping of the to-and-fro pulses in said amplifier laser.

Advantageously, said amplifier laser cooperates with selective reflecting means, placed in the axis of said laser amplifier and providing selectively for, firstly, the admission, into said amplifier laser, of said fraction of low-level beam coming from the oscillator and, secondly, the transmission, towards the energy transfer means, of the pump beam coming from said laser amplifier.

According to the invention, the selective reflecting means cooperating with the laser amplifier, like those cooperating with the energy transfer means of the embodiment with Brillouin medium, are preferably formed by a polarizing element, of the polarization separator cube type or Brewster plate type, associated with a quarter-wave plate or a Faraday type polarization rotator.

BRIEF DESCRIPTION OF THE DRAWINGS

Other characteristics and advantages of the invention will appear from the following description of preferred embodiments of the invention, given by way of a non-restrictive illustration, and from the appended drawings, in which:

FIG. 1 is a schematic drawing illustrating the configuration of the structure of emission of a power signal according to the invention, in the case of a single pass through a laser amplifier;

FIG. 2 shows a schematic drawing illustrating the configuration of the laser emission structure of the invention in the case of double pass of the pump beam through the laser amplifier;

FIG. 3 gives a schematic view of the configuration of the laser structure of the invention, with a double pass of the pump beam and energy transfer means with photo-reactive material;

FIG. 4 shows an embodiment of a configuration of the laser structure of the invention in the case of a pump beam with double pass, and of a Brillouin energy transfer medium;

DETAILED DESCRIPTION OF THE INVENTION

As shown in FIG. 1, the structure for emission of a signal according to the invention incorporates essentially:

a low-energy laser oscillator 11, fixing the spatial/temporal characteristics of the laser radiation;

a laser amplifier 12 providing for the generation of a pump beam 13, without precise control over the phase structure of the amplified wave. The laser amplifier 12 is supplied with a fraction 14 of the low-energy beam 15 coming from the oscillator 11;

a nonlinear medium 16, providing for the amplification of the remaining fraction 17 of the beam 15 coming from the oscillator 11, by energy transfer from the pump beam 13 coming from the amplifier stage 12. The final laser radiation 10 has no distortions.

The configuration of FIG. 1 further includes a plate 18 for separating the two fractions 14, 17 of the beam 15 coming from the oscillator, as well as means 19 for orienting the beams 14, 17 in the laser chain, and means (not shown) for the insulation of the oscillator and the amplifier.

The embodiment of the invention, as shown schematically in FIG. 2, produces the pump beam 23 by double pass through the laser amplifier 12. This makes it possible to extract more energy from the laser rod of the amplifier 12. This double pass is obtained through reflecting means 21.

The use of a pseudo-mirror with phase conjugation 21, instead of a standard mirror made, for example, simply with a network of cube corners (see article by CHIPMAN et al., Applied Optics, vol. 27, No. 15, 1st August 1988), makes it possible advantageously to correct the spatial low-frequency aberrations of the rod and therefore provides, firstly, for a controlled divergence of the pump beam 22, 23 and, secondly, for a self-alignment of the to-and-fro beams 22 in the amplifier stage 12 and the pump beam 23 in the nonlinear medium 16.

The energy transfer process without transfer of the phase of the pump may be achieved in at least two ways:

either by two-wave mixing in a photo-reactive material, or by amplification by the stimulated Brillouin scattering process. These two processes are respectively illustrated in FIGS. 3 and 4.

Two-wave Mixture in a Photo-reactive Material (FIG. 3)

The oscillator 11 delivers pulsed energy or continuous power such that its spatial, temporal and frequential properties are perfectly controlled and not limited by the thermal phenomena described earlier. The laser is, for example, a solid laser pumped by laser diodes.

The separating plate 18 enables the beam 15 coming from the oscillator 11 to be separated into two arms 14, 17, one of them 14 being designed to be amplified at 12 to act as a pump, the other one 17 being designed to act as a reference beam which will be amplified without distortion at 36.

The amplifier 12 is a laser amplifier, for example a Nd:YAG rod pumped by flash lamp or by laser diodes.

The pseudo-mirror 21 with phase conjugation is advantageously formed by a network of "catadiopter" type cube corners.

The element 31 is an optical delay line providing, in pulsed mode, for a non-overlapping of the to-and-fro pulses in the amplifier 12, in order to ensure the optimum extraction of energy, hence the optimum gain amplification in a double pass.

The element 32 enables the beam 14 to be transmitted from the oscillator 11 towards the amplifier 12 and the return beam 33 to be reflected towards the energy transfer means 36 after reflexion on the reflecting means 21. This element 32 is formed, for example, by a polarizer element such as a polarisation separator cube or a Brewster plate associated with a quarter-wave plate or a Faraday type polarization rotator.

The element 34 is a fast shutter, for example a plasma shutter, used in the invention in pulsed mode, the function of which is to prevent any return of beam 14 to the oscillator 11.

In the energy transfer means 36, formed by a photoreactive material such as a barium titanate (BaTiO$_3$) crystal or strontium and barium niobate crystal (SBN), there occurs the two-wave interaction between the low-signal reference beam 17, coming directly from the oscillator 11 and oriented by means of plates 18 and 39 (mirror) and the high-intensity pump beam 33. The two beams mutually form a small angle (5° to 30°).

The relative intensity of the two beams 17 and 33 is, for example, in a ratio of 100 to 1000. In this case, the interaction is expressed by a transfer of energy from the pump beam 33 (which is intense) towards the low-intensity reference beam 17, without transfer of the phase aberrations that might exist in the pump beam 33. The principle of interactions of this type may be found in the references J.P. HUIGNARD et al., Optical Engineering, July/August 1985, vol. 24, No. 4, and G. LE SAUX et al., IEEE J.QE-23, No. 10, October 1987. The beam 30 thus amplified has the spatial and spectral properties of the oscillator 11, optimized for the subsequent applications, notably as regards the divergence.

Amplification by Simulated Brillouin Scattering (FIG. 4)

The same references designate the same elements in FIGS. 3 and 4.

The interaction between the two waves, firstly the reference wave 17 and, secondly, the pump wave 33, takes place in the energy transfer means 46. The physical mechanism is that of the stimulated Brillouin scattering. The active medium may be a gas (CH$_4$, SF$_6$, etc.), a liquid (CS$_2$, acetone, hexane etc.) or a solid such as silica. The two interacting waves 17, 33 are counter-propagative.

For the amplification of the low-signal reference beam 17 to take place by energy transfer from the intense pump beam 33, it is necessary for these two waves to be frequency shifted by a magnitude υcharacteristic of medium known as the "Brillouin shift" medium (some hundreds of MHz in gases to about 10 GHz in silica). If this condition is achieved, the gain in amplification of the reference beam may be great, to up to several tens of dB (see ATKINS et al, Electronics Letters 22(10) 556 (1986)).

It must be noted that the stimulated Brillouin scattering process is efficient when the excitation of the pump is intense (of the order of 100 MW/cm$^2$) and/or when the interaction length between the two waves is great. This is why it is possible to use two types of geometries of cells, either in focused mode (very high energy density) or in guided mode (great length of interaction). In solids such as silica, it is rather the guided mode that will be used because of constraints of behavior the optical flux.

The element 19 makes it possible to achieve the frequency shift on the reference wave. Let $\upsilon_o$ be the optical frequency of the beam 15, 17 coming from the oscillator. $\upsilon_o$ is also the frequency of the pump beam 33. To be amplified in the energy transfer means 46, the reference beam 17 should be at the frequency $\upsilon_o.\upsilon_B$. The element 49 is therefore formed by the same medium as the energy transfer means 46 and enables the generation, by stimulated Brillouin scattering, of a back-scattered and conjugate wave 41 which therefore has the same spatial qualities as the reference wave 17. The configuration chosen to make the shifting means 49, will be rather a guided configuration that favors the large interaction lengths, given the low power of the beam 17 coming from the oscillator 11. It will be, for example, a multimode optical fiber with hollow core filled with the same material (gas or liquid) as that used in the energy transfer Brillouin medium 46.

The orientation of the beam from the optical fiber 49 towards the energy transfer means 49 is done by selection of polarization using a polarizer 43 and a quarter-wave plate 42.

It will be noted that the principle of the invention is preserved if the amplification of the pump beam is done by means of more than two passes in the laser rod of the laser amplifier 12 rather than by a double pass. In this case, the extraction of energy from the laser medium is only more efficient.

What is claimed is:

1. A pulsed power laser comprising:
   a low energy laser oscillator stage for generating a low-level output beam;
   a laser amplifier stage for receiving at least a fraction of the low-level output beam to generate a pump beam; and
   energy transfer means for amplifying the low-level output beam of the low energy laser oscillator stage by energy transfer from the pump beam generated by the laser amplifier stage without phase transfer from said pump beam to said low-level beam during amplification.

2. A laser according to claim 1, wherein said energy transfer means comprises a nonlinear medium.

3. A laser according to claim 2, wherein said nonlinear medium comprises a photo-refractive material.

4. A laser according to claim 3, wherein the photo-reactive material belongs to the group consisting of BaTiO and SBN.

5. A laser according to claim 3, further comprising means for providing said pump beam coming from the laser amplifier stage and said low-level beam coming from the laser oscillator stage with a low relative angle of incidence of between about 5° and about 30° at entry into said photo-refractive material.

6. A laser according to claim 2, wherein the non-linear medium is a Brillouin energy transfer medium for stimulating Brillouin scattering.

7. A laser according to claim 6, further comprising frequency shift means for shifting a frequency of one of the low level beam coming from the oscillator stage and the pump beam of the laser amplifier stage with respect to the other.

8. A laser according to claim 7, wherein said frequency shifting means comprises a hollow core multi-mode optical fiber filled with a same material as said Brillouin energy transfer medium, said fiber including optical delay means.

9. A laser according to claim 8, further comprising selective reflecting means for selective admission, into said energy transfer means, of said low-level beam from the oscillator stage.

10. A laser according to claim 9, wherein the selective reflecting means comprises a polarizing element having one of a quarter-wave plate and a Faraday type polarization rotator.

11. A laser according to claim 10, wherein the polarizing element of the selective reflecting means comprises one of a polarization separator cube and a Brewster plate.

12. A laser according to claim 7, wherein said frequency shift means comprises an optical element of a same material as the non-linear medium of the energy transfer means.

13. A laser according to claim 1, further comprising means for supplying said laser amplifier stage with a fraction of the low-level beam coming from the oscillator stage.

14. A laser according to claim 13, further comprising beam-transmitting means for transmitting the low-level beam in at least one second pass through said amplifier stage.

15. A laser according to claim 14, wherein said beam-transmitting means comprises a pseudo-mirror with phase conjugation means.

16. A laser according to claim 14, further comprising an optical delay line for preventing overlapping of transmission of the low-level beams through said amplifier stage during each pass therethrough.

17. A laser according to claim 16, further comprising selective reflecting means, placed at an optical axis of said laser amplifier stage for selectively providing admission, into said amplifier laser stage, of said fraction of low-level beam coming from the oscillator stage and, transmission, towards the energy transfer means, of the pump beam coming from said laser amplifier stage.

18. A laser according to claim 1, wherein said laser oscillator stage is a solid-state laser pumped by laser diodes.

19. A laser according to claim 1, wherein said laser amplifier stage is an Nd:YAG rod pumped by at least one of a flash lamp and a plurality of laser diodes.

* * * * *